May 3, 1960    E. M. HAINES ET AL    2,934,913
COMBINATION KITCHEN APPLIANCES
Filed Jan. 17, 1958    4 Sheets-Sheet 2
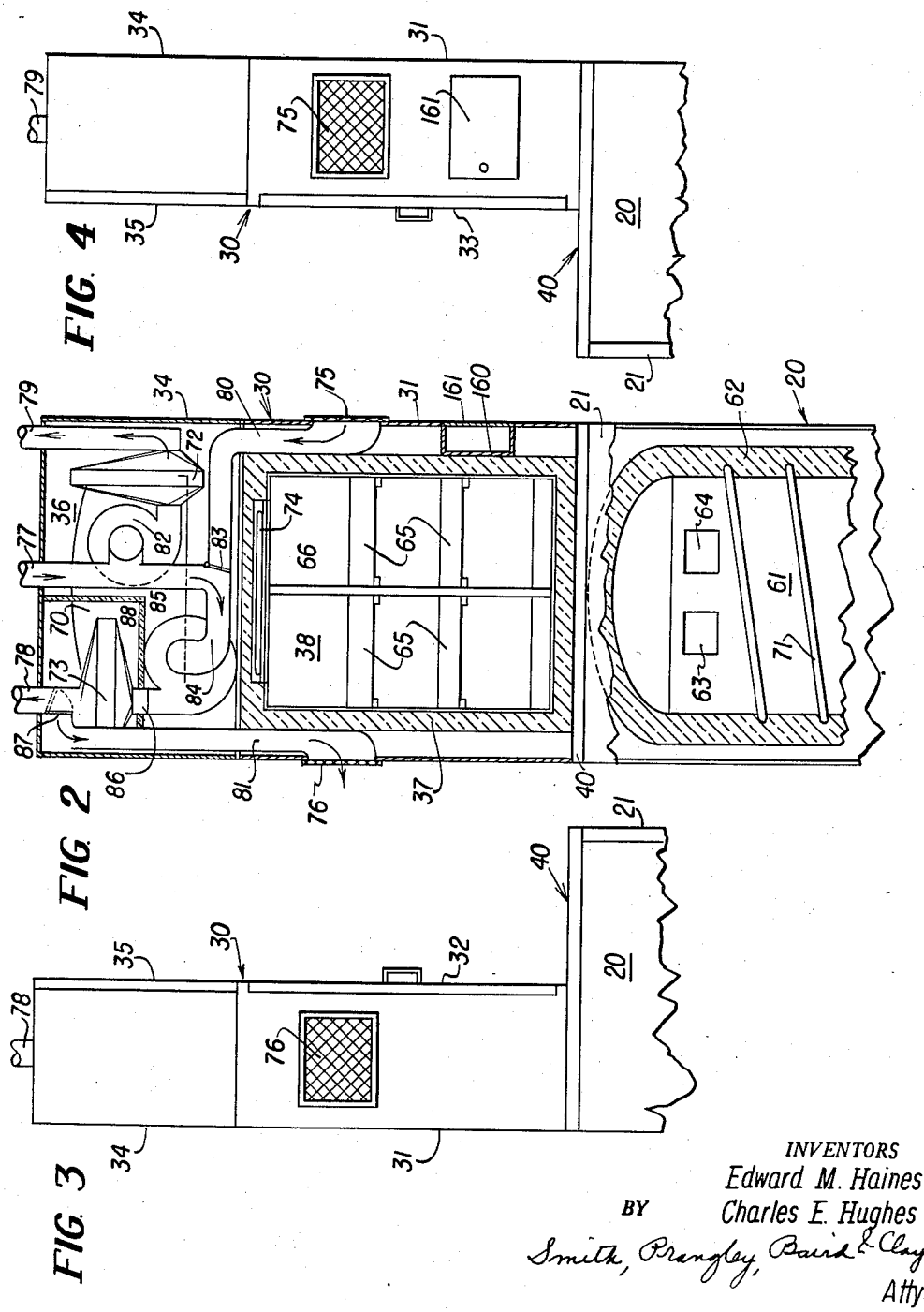
INVENTORS
Edward M. Haines
BY  Charles E. Hughes
Smith, Prangley, Baird & Clayton
Attys.

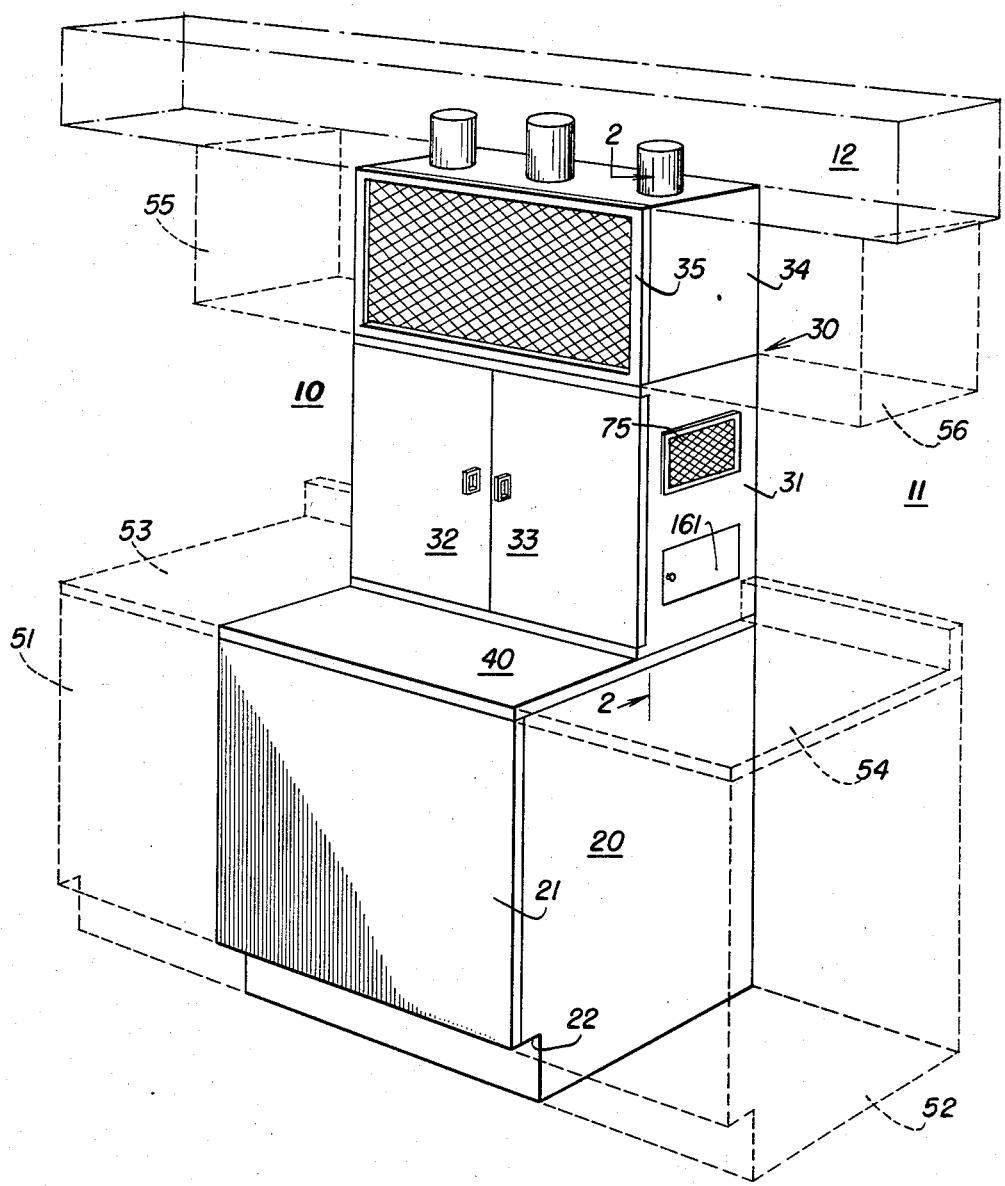

May 3, 1960 E. M. HAINES ET AL 2,934,913
COMBINATION KITCHEN APPLIANCES
Filed Jan. 17, 1958 4 Sheets-Sheet 3

INVENTORS
Edward M. Haines
Charles E. Hughes
BY
Smith, Prongley, Baird & Clayton,
Attys.

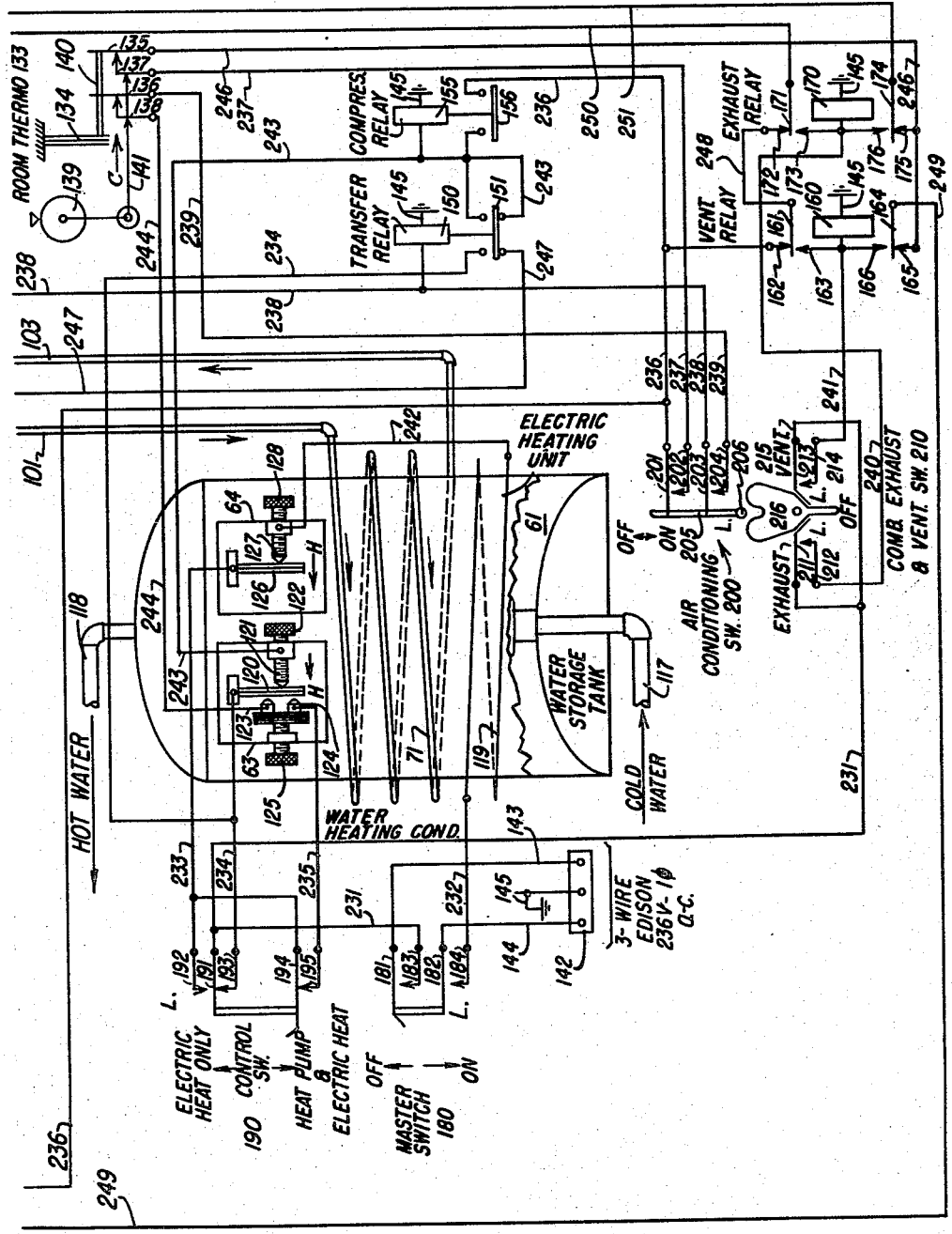

United States Patent Office 2,934,913
Patented May 3, 1960

2,934,913

COMBINATION KITCHEN APPLIANCES

Edward M. Haines, Lake Forest, and Charles E. Hughes, Berwyn, Ill., assignors to General Electric Company, a corporation of New York Application January 17, 1958, Serial No. 709,672

13 Claims. (Cl. 62—161)

The present invention relates to combination kitchen appliances, and more particularly to such combination kitchen appliances that perform water-heating, food-refrigerating, air-conditioning and kitchen-exhausting and ventilating functions, both separately and in various combinations, as desired.

It is a general object of the invention to provide a combination kitchen appliance of the character noted, that is so constructed and arranged that it will fit directly and in proper alignment into a standard kitchen base cabinet line and into a standard ktichen wall cabinet line, wherein the appliance is of unitary character so that it may be inserted interchangeably into the two standard kitchen lines noted, without reference to the other elements respectively incorporated in the two standard kitchen lines mentioned.

Another object of the invention is to provide a combination kitchen appliance of the character noted, that includes a lower base cabinet and an upper wall cabinet, wherein the base cabinet houses a water storage tank and the wall cabinet defines both a lower food storage compartment and an upper machinery compartment, so that the food storage compartment constitutes an upstanding refrigerator unit extending between the base cabinet arranged in the kitchen base cabinet line and the machinery compartment arranged in the kitchen wall cabinet line, and that also comprises a refrigerating machine including a refrigerant compressor housed in the machinery compartment and a refrigerant condenser arranged in heat-exchange relation with the water storage tank and a refrigerant evaporator arranged in heat-exchange relation with the food storage compartment.

Another object of the invention is to provide a kitchen wall cabinet of novel construction and arrangement and defining both a lower food storage compartment and an upper machinery compartment, wherein the machinery compartment houses a refrigerating machine, including a refrigerant compressor, as well as a refrigerant evaporator arranged in heat-exchange relation with the food storage compartment and also a refrigerant condenser, and wherein the wall cabinet also comprises a duct structure accommodating both circulation of air from and back to the kitchen and into heat-exchange relation with the evaporator and circulation of air from and back to the outside and into heat-exchange relation with the condenser.

A further object of the invention is to provide a kitchen wall cabinet of the character noted, wherein the duct structure incorporated therein also accommodates the exhausting of kitchen air to the outside, as well as the venting of outside air into the kitchen.

A still further object of the invention is to provide a kitchen wall cabinet of the character noted, wherein the duct structure incorporated in the wall cabinet includes air valve means that are selectively operated into proper controlling positions with respect to the required air circulation in response to corresponding operations of associated control switches that may be selectively operated by the cook in accordance with the operations desired.

Further features of the invention pertain to the particular arrangement of the steps of the method and of the elements of the system, whereby the above-outlined and additional operating features thereof are attained.

The invention, both as to its organization and method of operation, together with further objects and advantages thereof, will best be understood by reference to the following specification, taken in connection with the accompanying drawings, in which:

Figure 1 is a front perspective view of a kitchen appliance embodying the present invention, and illustrating the relation thereof to the usual base cabinet line and wall cabinet line arranged in the kitchen;

Fig. 2 is a vertical sectional view, partly broken away, of the upper front of the appliance shown in Fig. 1, taken in the direction of the arrows along the line 2—2 therein;

Fig. 3 is a fragmentary elevational view of the left side of the appliance shown in Fig. 1;

Fig. 4 is a fragmentary elevational view of the right side of the appliance shown in Fig. 1; and Figs. 5 and 6, taken together, are a diagrammatic illustration of the arrangement of the electrical and mechanical elements incorporated in the appliance shown in Fig. 1.

Figure 5:
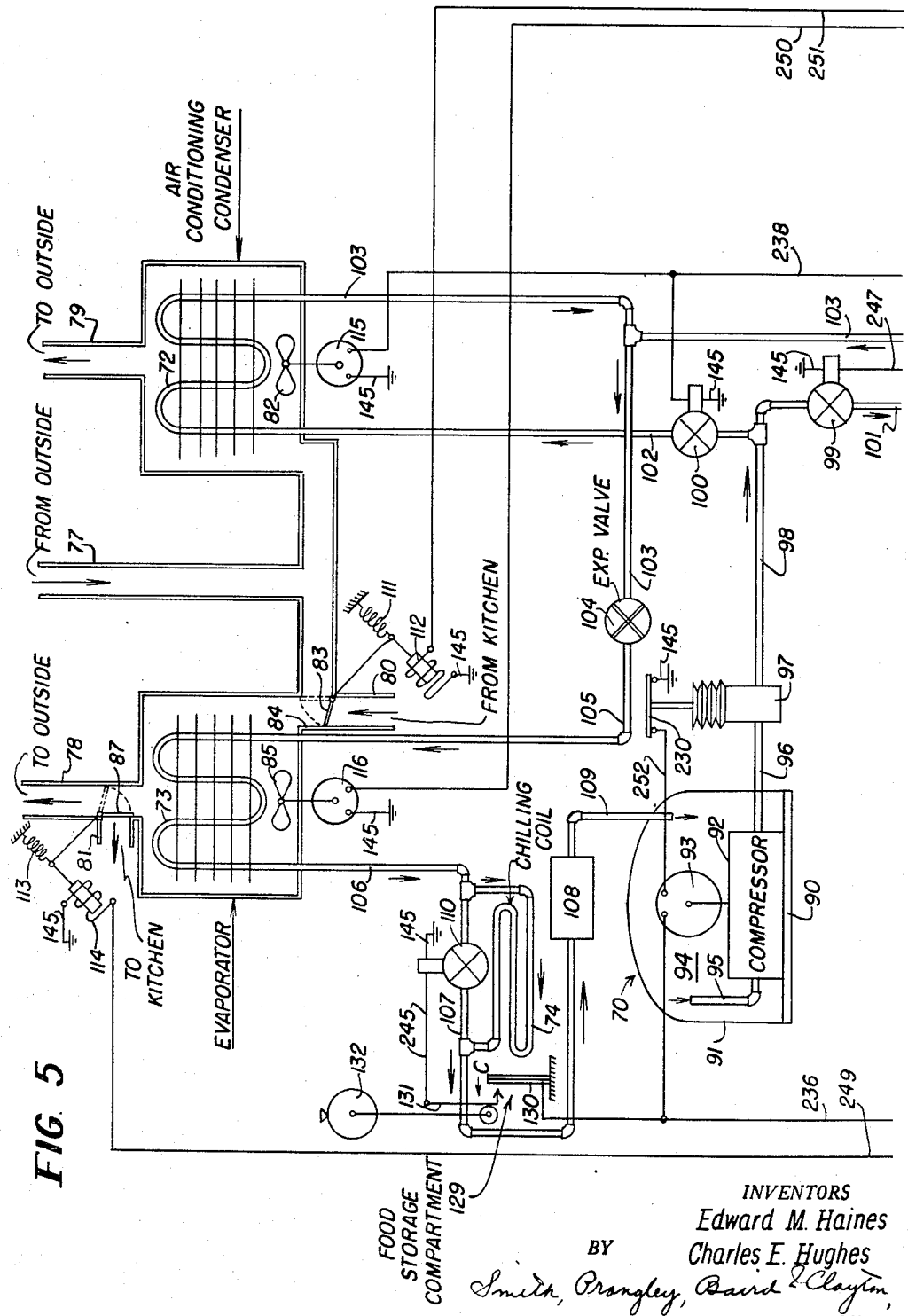

In order to form a unified diagram, Figs. 5 and 6 should be arranged lengthwise in respctive upper and lower adjacent positions.

Referring now to Fig. 1 of the drawings, there is illustrated a portion of a kitchen incorporating a kitchen appliance 10 embodying the features of the present invention; which appliance 10 is arranged against a wall (indicated at 11) of the kitchen and below a soffit (indicated at 12), disposed adjacent to the junction of the kitchen wall 11 and the ceiling, not shown, of the kitchen. The appliance 10 comprises an upstanding substantially box-like base cabinet 20, an upstanding substantially box-like wall cabinet 30 carried by the rear top of the base cabinet 20, and a counter top 40 carried by the front top of the base cabinet 20 and extending between the top front of the base cabinet 20 and the bottom front of the wall cabinet 30. The wall cabinet 30 includes a lower section 31 provided with a pair of front doors 32 and 33 and an upper section 34 provided with a removable front panel 35, the front doors 32 and 33 in their closed positions and the front panel 35 being flush with each other. Also the base cabinet 20 includes a removable front panel 21, terminating at the top thereof at " the front of the counter top 40, and terminating at the bottom thereof at a toe-receiving recess 22, provided a the bottom of the base cabinet 20. In the arrangement, the cabinets 20 and 30 may be formed fundamentally of sheet steel and provided with a suitable exterior finish of porcelain or resin enamel; while the counter top 40 may be formed of stainless steel, plastic material, etc.

In the kitchen: two other conventional base cabinets 51 and 52 are respectively indicated at the left and at the right of the base cabinet 20 and respectively carrying two counter tops respectively indicated at 53 and 54; and two other conventional wall cabinets 55 and 56 are respectively indicated at the left and at the right of the wall cabinet 30 and just below the soffit 12 in the kitchen. In the arrangement: the base cabinet 20 has a standard height so that the counter top 40 is flush with the counter top sections 53 and 54; and the base cabinet 20 has a standard depth from back to front so that the front panel 21 is flush with the fronts of the base cabinets 51 and 52. Similarly, the wall cabinet 30 has a standard height so that the junction between the lower and upper sections 31 and 34 thereof is flush with the bottoms of the wall cabinets 55 and 56, and the wall cabinet 30 has a standard depth from back to front so that the front panel 35 is flush with the fronts of the wall cabinets 55 and 56. For example, the counter top 40 may be disposed 36" above the kitchen floor and the front panel 21 may be disposed 26" forwardly of the rear wall of the base cabinet 20. The wall cabinet 30 may have a height of 48", with the upper section 34 having a height of 18"; and the front panel 35 may be disposed 13" forwardly of the rear wall of the wall cabinet 30. The dimensions mentioned are not critical, but comprise the standard dimensions of conventional kitchen base cabinets and conventional kitchen wall cabinets; whereby these dimensions accommodate fitting of the base cabinet 20 in a conventional kitchen base cabinet line, without special reference to position thereof with respect to the other elements therein, and fitting of the wall cabinet 30 in a conventional kitchen wall cabinet line, without special reference to position thereof with respect to the other elements therein.

Referring now to Figs. 2 to 4, inclusive, the base cabinet 20 houses an upstanding water storage tank 61 that is provided with a layer 62 of suitable heat-insulating material, such as glass wool; which tank 61 carries primary and secondary thermostats 63 and 64 that are employed for a purpose more fully explained hereinafter; and the front panel 21 is removably supported upon the base cabinet 20 to accommodate access to the thermostats 63 and 64. The upper section 34 of the wall cabinet 30 defines a machinery compartment 36 therein; and the lower section 31 of the wall cabinet 30 is provided with heat-insulating walls 37 defining a food storage compartment 38 therein. Preferably the front doors 32 and 33 are hinged adjacent to the outer side edges thereof so that they swing in opposite directions over the counter top 40; and of course, the doors 32 and 33 incorporate heat-insulating material, not shown. Accordingly, the food storage compartment 38 is insulated against the flow of heat thereinto from the kitchen and from the base cabinet 20 and from the machinery compartment 36. It is also advantageous that the interior of the food storage compartment 38 carry a removable shelf or other element 65 supported by a centrally disposed standard 66, so as to accommodate support of the food products in readily accessible position in the food storage compartment 38 when the front doors 32 and 33 occupy their open positions.

The appliance 10 also comprises a refrigerating machine including a refrigerant motor-compressor unit 70 arranged in the machinery compartment 36, a first condenser 71 in the form of a coil arranged in heat-exchange relation with the water storage tank 61, a second air-cooled refrigerant condenser 72 arranged in the machinery compartment 36, a first air-cooled refrigerant evaporator 73 arranged in the machinery compartment 36, and a second refrigerant evaporator 74 in the form of a flat sinuous coil arranged in heat-exchange relation with the top wall of the metal liner of the food storage compartment 38. Also duct structure is provided in the appliance 10 that includes a kitchen air inlet 75 of substantially grill-like form carried by the right side wall of the lower section 31, and a kitchen air outlet 76 of substantially grill-like form carried by the left side wall of the lower section 31, as well as an outside air inlet conduit 77 and two outside air outlet conduits 78 and 79 carried by the top wall of the upper section 34 and extending into the soffit 12. In the arrangement, the outside air inlet 77 extends through the soffit 12 and the outside kitchen wall to the exterior, while the outside air outlet conduits 78 and 79 may be combined in the soffit 12 and then extend through the outside kitchen wall to the exterior. The kitchen air inlet 75 communicates with a conduit 80 arranged between the right side wall of the lower section 31 and the adjacent insulating side wall 37 of the food storage compartment 38 and extends upwardly into the machinery compartment 36; and similarly, the kitchen air outlet 76 communicates with a conduit 81 arranged between the left side wall of the lower section 31 and the adjacent insulating side wall 37 of the food storage compartment 38 and extends upwardly into the machinery compartment 36. The outside air inlet conduit 77 is connected to the inlet of a blower 82 arranged in the machinery compartment 36, the outlet of the blower 82 being connected to direct air over the condenser 72 and thence through the outside air conduit 79. Also the outside air inlet conduit 77 and the conduit 80 are respectively connected to two inlets of a valve 83 arranged in the machinery compartment 36 and provided with an outlet connected to a conduit 84, that is connected to the inlet of a blower 85 arranged in the machinery compartment 36. The outlet of the blower 85 is connected to a conduit 86 that is connected to direct air over the evaporator 73 and thence into the inlet of a valve 87 arranged in the machinery compartment 36, the valve 87 being provided with two outlets respectively connected to the conduit 81 and to the outside air outlet conduit 78. In the machinery compartment 36, a heat-insulating barrier 88 is arranged between the condenser 72 and the evaporator 73 so as to prevent the flow of heat therebetween.

When the blower 82 is operated, outside air is taken thereinto from the outside air inlet conduit 77 and is discharged therefrom into heat-exchange relation with the condenser 72 and is then conducted via the outside air outlet conduit 79 to the outside. When the blower 85 is operated, air from the conduit 84 is taken thereinto, which air is supplied either from the outside air inlet conduit 77 or from the conduit 80 communicating with the kitchen air inlet 75, depending upon the position of the valve 83. The air from the blower 85 is discharged via the conduit 86 into heat-exchange relation with the evaporator 73 and is then conducted to the valve 87. From the valve 87, the air is supplied either to the outside air conduit 78 or to the conduit 81 communicating with the kitchen air outlet 76, depending upon the position of the valve 87.

The connection and arrangement of the refrigerating machine is best illustrated in Figs. 5 and 6, wherein it will be observed that the motor compressor unit 70 is of the hermetically sealed type, including a base 90 and a cooperating casing 91, as well as the compressor 92 and the electric drive motor 93. The casing 91 defines the hermetically sealed chamber 94 enclosing the compressor 92 and the drive motor 93 and containing the usual charge of refrigerant and lubricating oil. Ordinarily the refrigerant is "Freon-F12"; and the compressor 90 is provided with an intake conduit 95 communicating with the chamber 94 and a discharge conduit 96 extending through the casing 91 to the exterior. The discharge conduit 96 is connected via a pressurestat 97 to a manifold conduit 98 that is connected to two valves 99 and 100 of the solenoid operated type, the valves 99 and 100 being mechanically biased into their closed positions. The valve 99 also communicates with a conduit 101 extending to the inlet of the condenser 71; and the valve 100 also communicates with a conduit 102 extending to the inlet of the condenser 72. The outlets of the condensers 71 and 72 are connected in parallel to a liquid conduit 103 that is connected to the inlet of an expansion valve 104, the outlet of which is connected to a conduit 105 extending to the inlet of the evaporator 73. The outlet of the evaporator 73 is connected via a conduit 106 to the inlet of the evaporator 74, and the outlet of the evaporator 74 is connected to a conduit 107 extending to a drying unit 108 that is connected to a suction conduit 109 extending through the casing 91 and communicating with the chamber 94. A normally closed bypass valve 110 of the solenoid operated type is connected between the conduits 106 and 107 and employed for a purpose more fully explained hereinafter.

As illustrated, the valve 83 is normally biased by a coil spring 111 into its position connecting the outside air inlet conduit 77 to the conduit 84 and is operative into its position connecting the conduit 80 to the conduit 84 by an associated solenoid 112. Similarly, the valve 87 is normally biased by a coil spring 113 into its position discharging into the outside air outlet conduit 78 and is operative into its position discharging into the conduit 81 by an associated solenoid 114. The blowers 82 and 85 are respectively driven by two respectively connected electric drive motors 115 and 116. A cold water inlet pipe 117 is connected to the bottom of the water storage tank 61, and a hot water outlet pipe 118 is connected to the top of the water storage tank 61; and an electric heating unit 119 is also arranged in heat-exchange relation with the water storage tank 61. Preferably, the heating unit 119 is of the sheathed resistance conductor type and is arranged in wrap-around relation with the bottom of the cylindrical side wall of the water storage tank 61 in the general manner disclosed in U.S. Patent No. 2,452,214, granted October 26, 1948, to Oliver G. Vogel and Francis E. Kirk. The thermostats 63 and 64 are arranged in heat-exchange relation with the upper portion of the water storage tank 61; and the condenser 71 is arranged in heat-exchange relation with the intermediate portion thereof.

Referring to Fig. 6, the primary thermostat 63, may be of any suitable type, but has been illustrated as of a conventional type comprising a bimetallic element 120 movable toward the left as the temperature thereof is increased, a cooperating right contact 121 carried by an adjustable member 122, and a pair of cooperating left contacts 123 and 124 carried by an adjustable member 125. Likewise, the secondary thermostat 64 may be of any suitable type, but has been illustrated as of a conventional type comprising a bimetallic element 126 movable toward the left as the temperature thereof is increased, and a cooperating right contact 127 carried by an adjustable member 128. Also, as illustrated in Fig. 5, a food storage compartment thermostat 129 is operatively associated with the food storage compartment 38 and responsive to the temperature thereof. The food storage compartment thermostat 129 may be of any suitable type, but has been illustrated as of a conventional type comprising a bimetallic element 130 movable toward the left as the temperature thereof is decreased, a cooperating contact spring 131, and a manually adjustable dial 132 for selectively setting the position of the contact spring 131 and consequently the control temperature of the thermostat 129. Further, as illustrated in Fig. 6, a room thermostat 133 is arranged in the kitchen, or at least in heat-exchange relationship therewith, and responsive to the temperature thereof. The room thermostat 133 may be of any suitable type, but has been illustrated as of a conventional type comprising a bimetallic element 134 movable toward the right as the temperature thereof is decreased, a first pair of cooperating contact springs 135 and 136, a second pair of cooperating contact springs 137 and 138, and a manually adjustable dial 139. In the room thermostat 133, the bimetallic element 134 acts upon a member 140 engaging the contact springs 135 and 136 and urging them to disengage the respectively cooperating contact springs 137 and 138, while the adjustable dial 139 acts upon a member 141 engaging the contact springs 137 and 138 and urging them to engage the respectively cooperating contact springs 135 and 136.

The appliance 10 further comprises a terminal block 142 that is connected to a 3-wire Edison source of power supply, that may be of 236 volts, single-phase, A.-C. The power supply includes two outside ungrounded conductors 143 and 144 and a grounded neutral conductor 145. Also the appliance 10 comprises a relay group including a transfer relay 150, a compressor relay 155, a vent relay 160, and an exhaust relay 170. The transfer relay 150 is provided with a contact bridging member 151 having both back and front contacts, while the compressor relay 155 is provided with a contact bridging member 156 having front contacts. The vent relay 160 controls a movable contact spring 161 that cooperates with a back contact spring 162 and with a front contact spring 163, and also controls a movable contact spring 164 that cooperates with a back contact spring 165 and with a front contact spring 166. Similarly, the exhaust relay 170 controls a movable contact spring 171 that cooperates with a back contact spring 172 and with a front contact spring 173, and also controls a movable contact spring 174 that cooperates with a back contact spring 175 and with a front contact spring 176. Further, a set of control switches is provided including a master switch 180, a control switch 190, an air-conditioning switch 200 and a combination exhaust and vent switch 210. The master switch 180 has an upper off position and a lower on position; the control switch 190 has an upper electric heat only position and a lower heat-pump and electric heat position; the combination switch 210 has an intermediate off positon, a left exhaust position and a right vent position; and the air-conditioning switch 200 has an upper off position and a lower on position. The master switch 180 comprises two movable contact springs 181 and 182 and two respectively cooperating stationary contact springs 183 and 184; the control switch 190 comprises two movable contact springs 191 and 194, a stationary contact spring 192 cooperating with the movable contact spring 191, and two stationary contact springs 193 and 195 respectively cooperating with the contact springs 191 and 194; the air-conditioning switch 200 comprises two movable contact springs 201 and 203 and two respectively cooperating stationary contact springs 202 and 204; and the combination exhaust and vent switch 210 comprises two movable contact springs 211 and 213 and two respectively cooperating stationary contact springs 212 and 214.

The switches 200 and 210 are interlocked; and specifically the contact springs 201 and 203 are operated by a member 205; while the contact springs 211 and 213 are operated by a pivotally mounted member 215. The member 205 is provided with a roller 206 at the lower end thereof that cooperates with a heart-shaped recess 216 formed in the adjacent upper end of the member 215. When the switch 200 occupies its upper off position, the switch 210 may be selectively operated into its left exhaust position and into its right vent position, since the roller 206 carried by the member 205 occupies its position disposed out of the recess 216 in the member 215. However, when the switch 200 is operated into its lower on position, the roller 206 carried by the member 205 enters the heart-shaped recess 216 formed in the member 215 and restores the same into its intermediate off position in the event it is out of such position, thereby operating the switch 210 into its off position. Also the pressurestat 97 comprises a contact bridging member 230 that is provided with a pair of power contacts. Specifically, the contact bridging member 230 normally occupies a closed position with respect to its contacts, but is operated into an open position with respect thereto in response to an abnormally high pressure of the refrigerant in the casing of the pressurestat 97, thereby to afford protection to the compressor 92 in the event of an abnormal operating condition thereof in the event both of the valves 99 and 100 should occupy their closed positions.

In the circuit arrangement, the outside conductors 143 and 144 are respectively terminated by the contact springs 181 and 182 of the master switch 180, and the contact springs 183 and 184 thereof respectively terminate two conductors 231 and 232. In the control switch 190, the contact spring 191 terminates the conductor 231, the contact springs 192 and 194 commonly terminate a conductor 233, and the contact springs 193 and 195 respectively terminate two conductors 234 and 235. In the air-conditioning switch 200, the contact springs 201, 202, 203 and 204 respectively terminate four conductors 236, 237, 238 and 239; and in the combination exhaust and vent switch, the contact springs 211 and 213 commonly terminate the conductors 231, while the contact springs 212 and 214 respectively terminate two conductors 240 and 241.

The conductor 232 is connected to one terminal of the electric heating unit 119, and the other terminal thereof is connected to a conductor 242. In the primary thermostat 63, the contacts 121, 123 and 124 respectively terminate a conductor 243, a conductor 244, and the conductor 235, while the bimetallic element 120 terminates the conductor 234. In the secondary thermostat 64, the contact 127 terminates the conductor 242, while the bimetallic element 126 terminates the conductor 233. In the food storage compartment thermostat 129, the contact spring 131 terminates a conductor 245, while the bimetallic element 130 terminates the conductor 236. In the room thermostat 133, the contact spring 135 terminates a conductor 246, while the contact springs 136, 137 and 138 respectively terminate the conductors 239, 237, and 244. The winding of the transfer relay 150 is connected between the conductors 238 and 145; the winding of the compressor relay 155 is connected between the conductors 243 and 145; the winding of the vent relay 160 is connected between the conductors 241 and 145; and the winding of the exhaust relay 170 is connected between the conductors 240 and 145. The pair of back contacts associated with the contact bridging member 151 of the transfer relay 150 respectively terminate a conductor 247 and the conductor 243; while the pair of front contacts associated with the contact bridging member 151 respectively terminate the conductors 234 and 243. The pair of front contacts associated with the contact bridging member 156 of the compressor relay 155 respectively terminate the conductors 243 and 236. The contact springs 161, 162, 163, 164, 165 and 166 of the vent relay 160 terminate a conductor 248, the conductor 236, the conductor 241, a conductor 249, the conductor 246 and the conductor 241. The contact springs 171, 172, 173, 174, 175 and 176 of the exhaust relay 170 respectively terminate a conductor 250, the conductor 248, the conductor 240, a conductor 251, the conductor 246 and the conductor 240.

The solenoid 112 is connected between the conductors 251 and 145; the solenoid 114 is connected between the conductors 249 and 145; the blower motor 115 is connected between the conductors 238 and 145; the blower motor 116 is connected between the conductors 250 and 145; the solenoid of the valve 99 is connected between the conductors 247 and 145; the solenoid of the valve 100 is connected between the conductors 238 and 145; and the solenoid of the valve 110 is connected between the conductors 245 and 145. The terminals of the compressor drive motor 93 are respectively connected to the conductor 236 and to a conductor 252; while the contacts associated with the bridging member 230 of the pressurestat 97 respectively terminate the conductors 252 and 145.

In the disposition of the equipment, the various switches 180, 190, 200 and 210, and the various relays 150, 155, 160 and 170, as well as the terminal block 142, may be housed in a metal casing or box 160 arranged in the lower section 31 of the wall cabinet 30, as shown in Fig. 2; which box 160 may be disposed between the right insulating wall 37 of the food storage compartment 38 and the adjacent right side wall of the lower section 31, and accessible through an opening closed by a cooperating door 161. The food storage compartment thermostat 129 may be carried by one of the front doors 32 or 33; and the kitchen thermostat 133 may be arranged in any convenient location in the kitchen, or carried by the door 161, if desired.

Considering now the general mode of operation of the appliance 10 and assuming that no air-conditioning of the kitchen is required and that the water in the storage tank 61 is to be heated entirely by the electric heating unit 119, the control switch 190 is operated into its upper position (electric heat only) and the master switch 180 is operated into its lower posiion (on); whereby a direct circuit is completed for energizing the electric heating unit 119 across the outside line conductors 143 and 144 of the 3-wire Edison source. Further assuming that the water in the storage tank 61 is relatively cold, the circuit mentioned extends from the outside line conductor 143 via the contact springs 181 and 183, the conductor 231, the contact springs 191 and 192, the conductor 233, the bimetallic element 126, the right contact 127, the conductor 242, the eletcric heating unit 119, the conductor 232, and the contact springs 184 and 182 to the outside line conductor 144. When the electric heater 119 is thus energized, it produces heat, effecting heating of the water in the storage tank 61; with the result that the secondary thermostat 64 is controlled by the temperature of the water mentioned. For example, the member 128 of the secondary thermostat 64 may be set to hold a temperature of 150° F.; whereby the bimetallic element 126 ultimately responds to the temperature noted of the water stored in the storage tank 61 to open the contact thereof with the right contact 127 so as to effect deenergization of the electric heating unit 119 and the consequent termination of the heating of the water stored in the tank 61. Subsequently, when the temperature of the water stored in the tank 61 is reduced slightly below the control temperature of 150° F., the bimetallic element 126 of the secondary thermostat 64 again responds to reclose the contact thereof with the right contact 127 so as again to initiate energization of the electric heating unit 119 and the consequent heating of the water stored in the tank 61.

Now assuming that no air-conditioning of the kitchen is required and that the water in the storage tank 61 is to be heated by the combination of the condenser 71 and the electric heating unit 119, the control switch 190 is operated into its lower position (heat pump and electric heat) and the master switch 180 is operated into its lower position (on). At this point, it is noted that the primary thermostat 63 is selectively set by adjustment of the members 122 and 125 so that the bimetallic element 120 is responsive to a control temperature, such, for example, as 125° F., to govern the contacts 121, 123 and 124. For the present purpose, it may be assumed that when the temperature of the water in the storage tank 61 is below the control temperature of 125° F., the bimetallic element 120 disengages the left contacts 123 and 124 and engages the right contact 121, and when the temperature of the water noted is above the control temperature of 125° F., the bimetallic element 120 disengages the right contact 121 and engages the left contacts 123 and 124. Also, for the present purpose, it may be again assumed that in the secondary thermostat 64, when the temperature of the water in the storage tank 61 is below the control temperature of 150° F., the bimetallic element 126 engages the right contact 127, and when the temperature of the water noted is above the control temperature of 150° F., the bimetallic element 126 disengages the right contact 127.

Now assuming that the temperature of the water in the storage tank 61 is below 125° F., multiple circuits are completed for energizing the solenoid of the valve 99 and the winding of the compressor relay 155. The circuit for energizing the solenoid of the valve 99 extends from the outside line conductor 143 via the contact springs 181 and 183, the conductor 231, the contact springs 191 and 193, the bimetallic element 120 and the engaged right contact 121 to the conductor 243. The circuit mentioned further extends from the conductor 243 via the contact bridging member 151 and its engaged back contacts, the conductor 247 and the solenoid of the valve 99 to the grounded neutral conductor 145.

The circuit for energizing the winding of the compressor relay 155 extends via the previously traced path to the conductor 243, and therefrom via the winding of the compressor relay 155 to the grounded neutral conductor 145. When the solenoid of the valve 99 is thus energized, this valve is operated into its open position, thereby placing the manifold conduit 98 into direct communication with the conduit 101 extending to the condenser 71; and when the winding of the compressor relay 155 is thus energized, the latter relay operates to complete at its contact bridging member 156 multiple circuits for operating the compressor motor 93 and for operating the blower motor 116. The circuit for operating the compressor motor 93 includes the conductor 243, the contact bridging member 157 and the engaged front contacts, the conductor 236, the winding of the compressor motor 93, the conductor 252, the contact bridging member 230 and its engaged contacts, and the grounded neutral conductor 145; while the circuit for operating the blower motor 116 includes the conductor 236, the contact springs 162 and 161, the conductor 248, the contact springs 172 and 171, the conductor 250, the winding of the blower motor 116 and the grounded neutral conductor 145.

Accordingly, operation of the drive motor 93 is initiated; whereby the compressor 92 is operated so that gaseous refrigerant in the chamber 94 is drawn via the conduit 95 into the compressor 92 and compressed and then discharged via the conduit 96 and the casing of the pressures at 97 into the manifold conduit 98. Of course, compression of the gaseous refrigerant effects heating thereof; whereby the hot gaseous refrigerant proceeds from the manifold conduit 98 through the open valve 99 and via the conduit 101 into the condenser 71. In the condenser 71, the compressed gaseous refrigerant is cooled by heat exchange with the water stored in the tank 61; whereby the refrigerant is liquified and flows into the liquid conduit 103. From the liquid conduit 103, the refrigerant is expanded by the expansion valve 104 into the conduit 105 and then proceeds through the evaporator 73 and thence via the conduit 106 through the evaporator 74 and thence into the conduit 107 from which it is conducted through the drying unit 108 into the suction conduit 109. The drying unit 108 may contain silica gel or other drying agent so as positively to insure that no moisture contained in the gaseous refrigerant passes through the suction conduit 109; and from the suction conduit 109 the expanded gaseous refrigerant is returned back into the casing 91 to be recycled. Of course, the expanded gaseous refrigerant effects cooling of the evaporators 73 and 74; and at this point, it is assumed that the food storage compartment 38 is relatively warm so that the food storage compartment thermostat 129 occupies its open position in order that the valve 110 occupies its closed position causing the gaseous refrigerant to traverse the evaporator 74 in passing from the conduit 106 into the conduit 107. Hence, the evaporator 73 cools the air in heat exchange relation therewith; and the evaporator 74 effects cooling of the top wall of the metal liner of the food storage compartment 38 and the consequent cooling of the food storage compartment 38, as well as the food stored therein. As previously noted, the blower motor 116 is operated; and at this time, the valves 83 and 87 occupy their positions illustrated; whereby the outside air inlet conduit 77 is connected to the conduit 84 and the casing of the evaporator 73 is connected to the outside air outlet conduit 78. Accordingly, operation of the blower 85 effects circulation of outside air through the conduits 77 and 84 and thence into heat exchange relation with the evaporator 73 and thence via the conduit 78 back to the outside; whereby heat is removed from the outside air circulated into heat exchange relation with the evaporator 73. Also heat is removed from the food stored in the food storage compartment 38 as previously noted, effecting heating of the evaporator 74. It, of course, follows that the heat extracted by the two evaporators 73 and 74, as well as the frictional heat of the compressor 92, together with the heat of operation of the electric motor 93, are supplied to the circulated refrigerant and delivered to the condenser 71; which accumulated heat is extracted therefrom by the water in the storage tank 61 with the resulting heating thereof.

Operation of the compressor motor 93 continues, as explained above, and ultimately the temperature of the water stored in the tank 61 is elevated by the above-described heat pump action until the primary thermostat 63 senses the control temperature of 125° F. At this time, the primary thermostat 63 is operated, the bimetallic element 120 disengaging the right contact 121 and engaging the left contacts 123 and 124. When the bimetallic element 120 disengages the right contact 121 power is removed from the conductor 243, thereby interrupting the previously traced circuit for energizing the winding of the compressor relay 155 and the previously traced circuit for energizing the solenoid of the valve 99; whereby the compressor relay 155 restores and the valve 99 is returned into its normal closed position. Upon restoring, the compressor relay 155 opens the contact bridging member 156, thereby to interrupt the previously traced circuit for operating the compressor motor 93, and also the previously traced circuit for operating the blower motor 116; whereby operation of the compressor 92 is arrested and operation of the blower 85 is arrested. When the bimetallic element 120 engages the left contact 123, the conductor 234 is connected to the conductor 244; which operation is without effect at this time, but which operation prepares alternative circuits traced hereinafter for continuing the operation of the compressor motor 93 and the consequent continued operation of the refrigerating machine. As noted, these circuits are not completed at this time, by virtue of the fact that it has been previously assumed that air-conditioning of the kitchen is not required, so that air-conditioning switch 200 occupies its up position (off). When the bimetallic element 120 engages the left contact 124, the conductor 234 is also connected to the conductor 235, so as to complete an alternative circuit for energizing the electric heating unit 119; which circuit further extends from the conductor 235 via the contact springs 195 and 194, the conductor 233, the bimetallic element 126 and the right contact 127 of the secondary thermostat 64, the conductor 242, the electric heating unit 119, the conductor 232 and the contact springs 184 and 182 to the outside line conductor 144. Accordingly, at this time, the electric heating unit 119 is energized across the outside line conductors 143 and 144 so as to effect heating thereof and subsequently further heating of the water stored in the tank 61. As previously explained, the heating of the water stored in the tank 61 continues until the secondary thermostat 64 senses the control temperature of 150° F., whereby the bimetallic element 126 disengages the right contact 127 to effect deenergization of the electric heating unit 119.

Recapitulating, from the foregoing description, it will be understood that when the water in the storage tank 61 has a temperature below the control temperature of 125° F., the primary thermostat 63 effects operation of the refrigerating machine and the consequent heating of the water in the water storage tank 61 by the heat pump action. Thereafter, when the temperature of the water stored in the tank 61 reaches the control temperature of 125° F., the primary thermostat 63 is operated to arrest operation of the refrigerating machine and to initiate energization of the electric heating unit 119. Still subsequently, when the temperature of the water stored in the tank 61 reaches the control temperature of 150° F., the secondary thermostat 64 is operated to arrest energization of the electric heating unit 119. Hence, the water supplied via the cold water pipe 117 to the water storage tank 61 is heated from the ambient temperature to the control temperature of 125° F. by the heat pump action of the refrigerating machine, and the water is further heated to the control temperature of 150° F. by the electric heating action of the electric heating unit 119.

Now during the above-described water-heating operation, when hot water is withdrawn from the storage tank 61 via the hot water supply pipe 118, cold water from the cold water supply pipe 117 is supplied into storage tank 61. Hence, when a demand for hot water is made, the temperature of the water stored in the tank 61 is accordingly reduced; whereby the secondary thermostat 64 is selectively operated so as to effect selective energization of the electric heating unit 119 to maintain the temperature of the stored water within the temperature range 125° F. to 150° F. as described above. Now in the event a very substantial demand for hot water is made, the temperature of water stored in the tank 61 may fall first below the control temperature of 150° F. and then below the control temperature of 125° F.; whereby the secondary thermostat 64 and then the primary thermostat 63 are operated sequentially. The operation of the secondary thermostat 64 effects energization of the electric heating unit 119 as previously explained; and subsequently the operation of the primary thermostat 63 effects deenergization of the electric heating unit 119, together with initiation of operation of the refrigerating machine.

More particularly in this case, when the primary thermostat 63 responds to the temperature below the control temperature of 125° F., the bimetallic element 120 disengages the left contacts 123 and 124 and engages the right contact 121. When the bimetallic element 120 disengages the left contact 124, the previously traced circuit for energizing the electric heating unit 119 is interrupted; and when the bimetallic element 120 engages the right contact 121 the previously traced circuit for operating the compressor relay 155 is completed so as to bring about operation of the refrigerating machine in the manner previously described.

In view of the foregoing, it will be understood that the secondary thermostat 64 controls heating of the water by the electric heating unit 119 in the temperature range between 125° F. and 150° F.; while the primary thermostat 63 controls heating of the water by the condenser 71 (the heat pump action of the refrigerating machine) in the temperature range between the ambient temperature and 125° F.

Now in the foregoing description of the mode of operation of the apparatus to effect heating of the water stored in the tank 61, it will be understood that the control temperatures 150° F. and 125° F. are not altogether critical. More particularly, the user may selectively set the secondary thermostat 64 to maintain a high temperature of the water in the storage tank 61 that is disposed either somewhat above or somewhat below the control temperature of 150° F. by appropriate manipulation of the member 128. Similarly, the serviceman may selectively set the primary thermostat 63 to maintain a transfer temperature of the water in the storage tank 61 that is disposed either somewhat above or somewhat below the control temperature of 125° F. by appropriate manipulation of the members 122 and 125. However, as a practical matter, the maintenance of the control temperature of about 125° F. by the primary thermostat 63 is very advantageous, as it is highly desirable to heat the water by the heat pump action in the lower regions of the overall temperature range and to heat the water by electric heating action in the higher regions of the overall temperature range. This desirable operating control is inherent in the overall operating characteristic of the refrigerating machine, since the efficiency thereof in the heat pump action is exceedingly high in the lower region of the temperature range disposed below about 125° F. In other words, in the lower region of the temperature range disposed below about 125° F., a majority of the heat supplied to the condenser 71 is absorbed by the evaporators 73 and 74 from the media in heat exchange relation therewith; whereas in the upper region of the temperature range disposed above about 125° F., a substantial proportion of the heat supplied to the condenser 71 is derived directly from the compressor 92 and from the electric drive motor 93. Accordingly, it is highly desirable to operate the refrigerating machine in its heat pump action under the conditions so that the substantial proportion of the heat supplied to the condenser 71 is derived from heat exchange by the evaporators 73 and 74. Accordingly, the primary thermostat 63 should normally be set to effect the transfer from the heat pump action of the refrigerating machine to the electric heating action of the electric heating unit 119 at the control temperature of 125° F.±5° F.

In the foregoing explanation of the mode of operation of the refrigerating machine, it was assumed that the temperature of the food storage compartment 38 was relatively high; whereby the food storage compartment thermostat 129 occupied its open position. Now during the operation of the refrigerating machine, the evaporator 74 effects cooling of the food storage compartment 38; whereby the food storage compartment thermostat 129 is operated in the event the temperature in the food storage compartment 38 is reduced below the predetermined temperature preset by the manual dial 132. More particularly, the temperature of the food storage compartment 38 may be set in the normal range 50° F. to 60° F.; whereby the bimetallic element 130 engages the contact spring 131 when the control temperature falls below about 50° F. and disengages the contact spring 131 when the control temperature rises above about 60° F. When the bimetallic element 130 engages the contact spring 131 an obvious circuit is completed for energizing the solenoid of the valve 110; whereby this valve is operated into its open position, with the result that the expanded gaseous refrigerant passes directly from the conduit 106 to the conduit 107 in bypassing relation with the evaporator 74, so as to terminate effective cooling by the evaporator 74 of the food storage compartment 38. Subsequently, when the temperature of the food storage compartment 38 again rises to the control temperature of 60° F., the food storage compartment thermostat 129 is operated so that the bimetallic element 130 disengages the contact spring 131 bringing about the deenergization of the solenoid of the valve 110 in order to cause the latter valve to be returned into its closed position. When the valve 110 is thus closed, the expanded gaseous refrigerant is again circulated from the conduit 106 through the evaporator 74 to the conduit 107 in order to bring about further cooling of the food storage compartment 38.

In view of the foregoing explanation of the mode of operation of the refrigerating machine to cool the food storage compartment 38 under the control of the thermostat 129, it will be understood that when the refrigerating machine is otherwise operated, the valve 110 is controlled by the food storage compartment thermostat 129 so as to cause the evaporator 74 to maintain the temperature of the food storage compartment 38 within the range 50° F. to 60° F. Also, in this regard, it is mentioned that this effective range may be selectively adjusted by manipulation of the manual dial 132 so as to preset the pressure exerted upon the contact spring 131 that cooperates with the bimetallic element 130.

Now assuming that the kitchen in which the appliance 10 is located is to be air-conditioned, the master switch 180 is operated into its lower position (on), the control switch 190 is operated into its lower position (heat pump and electric heat), and the air conditioning switch 200 is operated into its lower position (on). In passing, it is noted that when the air-conditioning switch 200 is operated into its lower or on position, the combination exhaust and vent switch 210 is returned into its off position, in the event it does not already occupy its off position, by virtue of the cooperation between the roller 206 carried by the member 205 and the recess 216 formed in the member 215. At this time, it may be assumed that the water in the storage tank 61 is being heated by the heat pump action of the refrigerating machine, as a consequence of the primary thermostat 63 occupying its position sensing a temperature of the water below the control temperature of 125° F. In this case, the valve 99 occupies its open position, the compressor drive motor 93 is operated, the blower motor 116 is operated, the compressor relay 155 occupies its operated position and the valve 110 is selectively operated between its open and closed positions; all in the manner previously explained. Also in this case, it may be assumed that the room thermostat 133 occupies its position sensing a relatively high temperature of the kitchen as established by the manual dial 139. For example, it may be assumed that the temperature of the kitchen is at a temperature higher than a control temperature of 75° F. preset by the dial 139 into the room thermostat 133. Accordingly, the room thermostat 133 occupies its closed position so that the contact springs 135 and 136 respectively engage the contact springs 137 and 138, since the bimetallic element 134 is urged toward the left at relatively high temperatures in the kitchen. Hence at this time, and with the compressor relay 155 in its operated position, the power connected to the conductor 136 is further connected via the contact springs 201 and 202, the conductor 237 and the contact springs 137 and 135 to the conductor 246. The conductor 246 is connected via the contact springs 165 and 164 to the conductor 249; and also the conductor 246 is connected via the contact springs 175 and 174 to the conductor 251. The connection of power to the conductor 249 completes an obvious circuit for energizing the solenoid 114, while the connection of power to the conductor 251 completes an obvious circuit for energizing the solenoid 112. Accordingly, the solenoid 112 operates the valve 83 into its position opposite from that illustrated, and the solenoid 114 operates the valve 87 into its position opposite from that illustrated. Specifically at this time, the conduit 80 communicating with the kitchen air inlet 75 is connected by the valve 83 to the conduit 84, and the valve 87 is connected to discharge into the conduit 81 communicating with the kitchen air outlet 76. Hence, operation of the blower 85 effects the circulation of air from the kitchen into the kitchen air inlet 75 and into heat exchange relation with the evaporator 73 and thence back through the kitchen air outlet 76 into the kitchen; whereby the kitchen air is cooled and the heat in the kitchen is supplied to the evaporator 73 for transportation by heat pump action to the condenser 71 for the water heating purpose previously explained.

Now it may be assumed that during the heating of the water in the storage tank 61 and before the temperature thereof reaches the control temperature of 125° F. that the temperature of the kitchen is lowered to the control temperature of 75° F. In this case, the room thermostat 133 is operated and specifically the bi-metallic element 134 effects opening of the contact springs 135 and 136 with respect to the contact springs 137 and 138. Opening of the contact springs 135—137 interrupts the previously traced multiple circuits for energizing the solenoids 112 and 114; whereby the valves 83 and 87 are returned into their normal positions illustrated by the respective coil springs 111 and 113. When the valves 83 and 87 are thus returned into their normal positions, the circulation of kitchen air over the evaporator 73 is arrested, while the circulation of outside air over the evaporator 73 is resumed; whereby no further cooling of the kitchen air takes place at this time, but heat from the outside air is further supplied to the evaporator 73 for the heat pump purpose previously explained.

Subsequently, when the temperature of the kitchen rises above the preset control temperature of 75° F., the room thermostat 133 is again operated so as to effect reclosure of the contact springs 135—137 so as to effect reoperation of the solenoids 112 and 114 with the result that the positions of the valves 83 and 87 are again changed so as to bring about further cooling of the circulated kitchen air in the manner previously explained.

During the combination air-conditioning and heat pump cycle of the refrigerating machine, it may be assumed that the primary thermostat 63 is operated as a consequence of the temperature of the water stored in the tank 61 being elevated to the control temperature of 125° F.; and further, it may be assumed that at this time the room thermostat 133 occupies its closed position as the temperature of the kitchen is above the control temperature of 75° F. In this case, upon operation of the primary thermostat 63, the bimetallic element 120 upon disengaging the right contact 121 interrupts the direct circuit for energizing the winding of the compressor relay 155 and interrupts the direct circuit for energizing the solenoid of the valve 99; whereby the compressor relay 155 restores and the valve 99 is returned into its closed position. Upon restoring, the compressor relay 155 momentarily interrupts at its contact bridging member 156 certain of the circuits heretofore traced; however, without effect by virtue of the fact that the compressor relay 155 is immediately reoperated as explained below. Also upon operating, the primary thermostat 63 causes the bimetallic element 120 to engage the left contacts 123 and 124 so as to complete at the left contact 123 a connection for supplying power to the conductor 244, and so as to complete at the contact 124 the previously-traced circuit, including the secondary thermostat 64, for energizing the electric heating unit 119. Accordingly, the further heating of the water stored in the tank 61 proceeds under the control of the electric heating unit 119 and governed by the secondary thermostat 64, in the manner previously explained.

The supply of power to the conductor 244 completes a connection including the contact springs 138 and 136 of the room thermostat 133 in its closed position to the conductor 239; which connection is further extended via the contact springs 204 and 206 to the conductor 238, thereby to complete obvious multiple circuits for energizing the winding of the transfer relay 150 and the solenoid of the valve 100. Accordingly, the transfer relay 150 operates so that the contact bridging member 151 interrupts at its back contacts a further point in the circuit for energizing the solenoid of the valve 99 in order to insure that the latter valve occupies its closed position at this time. Also upon operating, the transfer relay 150 causes its bridging member 151 to close its front contacts thereby connecting the conductor 234 to the conductor 243 so as to complete an obvious circuit for reoperating the compressor relay 155. As previously noted, the solenoid of the valve 100 is energized; whereby the latter valve is operated into its open position, with the result that the compressed refrigerant flows from the manifold conduit 98 via the valve 100 in its open position into the conduit 102 and thence into the condenser 72. The compressed gaseous refrigerant is liquified in the condenser 72 and the liquid refrigerant passes therefrom into the liquid conduit 103 and thence to the expansion valve 104 and ultimately to the evaporator 73, in the manner previously explained. Also the application of power to the conductor 238 completes an obvious circuit for operating the blower motor 115; whereby the blower 82 is operated with the result that outside air from the outside air inlet conduit 77 is circulated over the condenser 72 and thence discharged via the outside air outlet conduit 79. The outside air circulated over the condenser 72 effects heat exchange therewith so that heat is removed from the condenser 72 in an obvious manner.

The operated compressor relay 155 connects the conductor 243 to the conductor 236 so as to sustain the operation of the compressor motor 93 and to sustain the operation of the blower motor 116 as well as to sustain the energization of the solenoids 112 and 114 so as to retain the circulation of the kitchen air into heat exchange relation with the evaporator 73.

At this time, it may be assumed that after operation of the primary thermostat 63, indicating that the temperature of the water stored in the tank 61 is above the control temperature of 125° F., the temperature of the kitchen air is lowered to the control temperature of 75° F., so as to effect operation of the room thermostat 133 and the consequent opening of the contact springs 135 and 136 with respect to the contact springs 137 and 138. In this case, opening of the contact spring 136 with respect to the contact spring 138 effects the removal of power from the conductor 239 and consequently from the conductor 238; with the result that the transfer relay 150 is restored, the valve 100 is returned into its closed position and operation of the blower motor 115 is arrested. Upon restoring, the transfer relay 150 causes its contact bridging member 151 to open its front contacts and to reclose its back contacts. Opening of the front contacts associated with the contact bridging member 151 interrupts the circuit for retaining operated the compressor relay 155; whereby the latter relay restores causing its contact bridging member 156 to interrupt a further point in the connection for supplying power to the conductor 236. When power is removed from the conductor 236, the previously-traced circuit for operating the compressor drive motor 93 is interrupted; whereby operation of the compressor 92 is arrested. Also, the removal of power from the conductor 236 interrupts the supply of power to the conductor 250 so as to arrest operation of the blower motor 116. Also the room thermostat opens the contact springs 135 and 137 so as to interrupt the multiple circuits for energizing the solenoids 112 and 114 with the result that the valves 83 and 87 are returned back into their normal positions illustrated. At this time, operation of the refrigerating machine is arrested, along with all of the auxiliary equipment, since the heat pump operation of the refrigerating machine is not required by the water heating system, and since the air-conditioning operation thereof is not required by the air-conditioning system.

Still subsequently, it may be assumed that while the conditions described above are maintained, the temperature of the kitchen air again rises to the control temperature of 75° F., effecting reoperation of the room thermostat 133 so as to bring about the closure of the contact springs 135—137 and 136—138. In this case, the contact springs 136—138 reclose the conductor 244 to the conductor 239 so as again to supply power to the conductor 238; with the result that the transfer relay 150 is reoperated, the valve 100 is again operated into its open position and the blower motor 115 is reoperated. Upon operating, the transfer relay 150 effects operation of the compressor relay 155 so that the conductor 243 is again connected to the conductor 236 so as to bring about reoperation of the compressor drive motor 93. The connection of power to the conductor 236 effects the connection of power to the conductor 250 with the result that the blower motor 116 is operated. Also the power is connected from the conductor 236 to the conductor 237 and thence to the conductor 246 and ultimately to the conductors 249 and 251 so as to bring about reoperation of the solenoids 114 and 112, so that the blower 85 effects further circulation of the kitchen air over the evaporator 73 and back to the kitchen, in the manner previously explained.

In view of the foregoing, it will be understood that when the master switch 180 occupies its on position and the control switch 190 occupies its heat pump and electric heat position and the air-conditioning switch 200 occupies its on position, that the water stored in the tank 61 is heated by the combination heat pump action of the refrigerating machine and the electric heating action of the electric heating unit 119, in the manner previously explained, while the kitchen air is cooled and maintained at the preset temperature established by the room thermostat 133. When the primary thermostat 63 occupies its position sensing a temperature of the water below the control temperature of 125° F., heat is supplied to the condenser 71, the heat being derived either from the kitchen air or from the outside air by the evaporator 73 depending upon the temperature of the kitchen air. On the other hand, when the primary thermostat 63 occupies its position sensing a temperature of the water above the control temperature of 125° F., the refrigerating machine is operated only when air-conditioning of the kitchen air is required; whereby in this case, the heat is extracted from the kitchen air by the evaporator 73, and the heat is transported to the outside air by the condenser 72 in a straightforward air-conditioning cycle.

In view of the foregoing description, it will be understood that the temperature of the kitchen air may be selectively preset by appropriate manipulation of the manual dial 139, the temperature range involved normally extending from about 60° F. to 90° F.

Now when air-conditioning of the kitchen air is not required, either exhaust or venting with respect to the kitchen air may take place, as required by the user, by selective operation of the switch 210; however, these operations can take place only when the air-conditioning switch 200 occupies its upper position (off) by virtue of the interlock between the switches 200 and 210. In this case, when the air-conditioning switch 200 occupies its off position, the combination switch 210 may be selectively operated from its intermediate position (off) either into its left position (exhaust) or into its right position (vent).

Operation of the switch 210 into its exhaust position closes the contact springs 211 and 212 so that the power on the conductor 231 (assuming that the master switch 180 occupies its on position) is connected to the conductor 240, thereby to complete an obvious circuit for operating the exhaust relay 170. Upon operating the exhaust relay 170 causes its contact spring 171 to disengage the contact spring 172 and to engage the contact spring 173 and causes its contact spring 174 to disengage the contact spring 175 and to engage the contact spring 176. Closure of the contact springs 171—173 connects the conductor 240 to the conductor 250, while closure of the contact springs 174—176 connects the conductor 240 to the conductor 251. The supply of power to the conductor 250 effects operation of the blower motor 116, while the supply of power to the conductor 251 effects energization of the solenoid 112 with the result that the valve 83 is operated into its position opposite from that illustrated. Accordingly, at this time, the operating blower 85 withdraws kitchen air through the kitchen air inlet 75 via the conduit 80 and exhausts the air over the evaporator 73, without effect, thence through the outside air outlet conduit 78 with the result that undesirable kitchen odors, etc. are exhausted along with the kitchen air to the outside. In order to arrest the exhausting operation, the combination switch 210 is returned back into its off position effecting the restoration of the exhaust relay 170 so that the blower motor 116 is deenergized and the solenoid 112 is deenergized so as to return the valve 83 back into its normal position.

Operation of the switch 210 into its vent position closes the contact springs 213 and 214 so that the power on the conductor 231 (assuming the master switch 180 occupies its on position) is connected to the conductor 241, thereby to complete an obvious circuit for operating the vent relay 160. Upon operating the vent relay 160 causes its contact spring 161 to disengage the contact spring 162 to engage the contact spring 163 and causes its contact spring 164 to disengage the contact spring 165 and to engage the contact spring 166. Closure of the contact springs 161—163 connects the conductor 241 to the conductor 250, while closure of the contact springs 164—166 connects the conductor 241 to the conductor 249. The supply of power to the conductor 250 effects operation of the blower motor 116, while the supply of power to the conductor 249 effects energization of the solenoid 114 with the result that the valve 87 is operated into its position opposite from that illustrated. Accordingly, at this time, the operating blower 85 draws fresh air from the outside air inlet conduit 77 and exhausts the air over the evaporator 73, without effect, and thence through the conduit 81 and ultimately through the kitchen air inlet 76, with the result that fresh air from the outside is ventilated into the kitchen. In order to arrest the venting operation, the combination switch 210 is returned back into its off position effecting the restoration of the vent relay 160 so that the blower motor 116 is deenergized and the solenoid 114 is deenergized so as to return the valve 87 back into its normal position.

At any time during the operation of the refrigerating machine, should the pressure in the manifold conduit 98 rise to an abnormally and undesirable pressure, the pressurestat 97 is operated; whereby the contact bridging member 230 thereof interrupts the circuit for operating the compressor motor 93 so as to prevent damage to the compressor 92 due to the abnormally high pressure mentioned. Subsequently, when the abnormally high pressure condition in the manifold conduit 98 subsides, the pressurestat 97 reoperates its contact bridging member 230 again to reclose the circuit for operating the compressor motor 93.

In the construction and arrangement of the appliance 10, the food storage compartment 38 has been described as a "regular" refrigerator compartment; however, the food storage compartment 38 may comprise only a chiller compartment in which vegetables, fresh fruits, etc., are stored in a chilled condition at a temperature of about 60° F. Obviously, the utility that is made of the food storage compartment 38 does not in any way affect the fundamental modulus of operation of the appliance 10, and in fact, the great majority of the heat supplied to the evaporative system is supplied to the evaporator 73, rather than to the evaporator 74, since the evaporator 73 comprises a primary evaporator and the evaporator 74 comprises a secondary evaporator. The herein described method of and apparatus for heating water and cooling air are disclosed and claimed in the copending divisional application of Edward M. Haines and Charles E. Hughes, Serial No. 840,626, filed September 17, 1959.

In view of the foregoing, it is apparent that there has been provided an improved kitchen appliance that can be readily arranged in a kitchen along with the other kitchen base cabinets and kitchen wall cabinets to provide a unified kitchen arrangement; which appliance is selectively operative to effect either exhausting of air from the kitchen or venting of fresh air into the kitchen, and which appliance also effects both heating of the water required in the kitchen, and elsewhere in the home, and cooling or air-conditioning of the kitchen air.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A kitchen appliance comprising an upstanding substantially box-like base cabinet defining a storage chamber therein, an upstanding substantially box-like wall cabinet carried by the rear top of said base cabinet, said wall cabinet defining a lower storage compartment therein and an upper machinery compartment therein, a front door carried by the lower front of said wall cabinet and affording access into said storage compartment, a counter top carried by the front top of said base cabinet and extending between the top front of said base cabinet and the bottom front of said wall cabinet, a refrigerating machine including a refrigerant compressor arranged in said machinery compartment and a refrigerant condenser arranged in heat-exchange relation with said storage chamber and a refrigerant evaporator arranged in heat-exchange relation with said storage compartment, means for operating said refrigerating machine, said wall cabinet also being provided with duct structure including a first air inlet from the kitchen and a second air inlet from the outside and a first air outlet to the kitchen and a second air outlet to the outside, and means for selectively controlling circulation of air into said first air inlet and then into heat-exchange relation with said evaporator and thence through said first air outlet and circulation of air into said second air inlet and then into heat-exchange relation with said evaporator and thence through said second air outlet.

2. A kitchen appliance comprising an upstanding substantially box-like base cabinet defining a storage chamber therein, an upstanding substantially box-like wall cabinet carried by the rear top of said base cabinet, said wall cabinet defining a lower storage compartment therein and an upper machinery compartment therein, a front door carried by the lower front of said wall cabinet and affording access into said storage compartment, a counter top carried by the front top of said base cabinet and extending between the top front of said base cabinet and the bottom front of said wall cabinet, a refrigerating machine including a refrigerating compressor arranged in said machinery compartment and a refrigerant condenser arranged in heat-exchange relation with said storage chamber and a refrigerant evaporator arranged in heat-exchange relation with said storage compartment, means for operating said refrigerating machine, said wall cabinet also being provided with duct structure including a first air inlet from the kitchen and a second air inlet from the outside and a first air outlet to the kitchen and a second air outlet to the outside, valve means having a first position effecting circulation of air into said first air inlet and then into heat-exchange relation with said evaporator and thence through said first air outlet and a second position effecting circulation of air into said second air inlet and then into heat-exchange relation with said evaporator and thence through said second air outlet, and means for selectively controlling the position of said valve means.

3. A kitchen appliance comprising an upstanding substantially box-like base cabinet defining a storage chamber therein, an upstanding substantially box-like wall cabinet carried by the rear top of said base cabinet, said wall cabinet defining a lower storage compartment therein and an upper machinery compartment therein, a front door carried by the lower front of said wall cabinet and affording access into said storage compartment, a counter top carried by the front top of said base cabinet and extending between the top front of said base cabinet and the bottom front of said wall cabinet, a refrigerating machine including a refrigerant compressor arranged in said machinery compartment and a first refrigerant condenser arranged in heat-exchange relation with said storage chamber and a second refrigerant condenser arranged in said machinery compartment and a refrigerant evaporator arranged in heat-exchange relation with said storage compartment, means for selectively operating said refrigerating machine to circulate refrigerant from said compressor to either one of said condensers and thence to said evaporator and then back to said compressor, said wall cabinet also being provided with duct structure including a first air inlet from the kitchen and a second air inlet from the outside and a first air outlet to the kitchen and a second air outlet to the outside, means for selectively controlling circulation of air into said first air inlet and then into heat-exchange relation with said evaporator and thence through said first air outlet and circulation of air into said second air inlet and then into heat-exchange relation with said evaporator and thence through said second air outlet, and additional means for controlling circulation of air into said second air inlet and then into heat-exchange relation with said second condenser and thence through said second air outlet.

4. A kitchen appliance comprising an upstanding substantially box-like base cabinet defining a storage chamber therein, an upstanding substantially box-like wall cabinet carried by the rear top of said base cabinet, said wall cabinet defining a lower storage compartment therein and an upper machinery compartment therein, a front door carried by the lower front of said wall cabinet and affording access into said storage compartment, a counter top carried by the front top of said base cabinet and extending between the top front of said base cabinet and the bottom front of said wall cabinet, a refrigerating machine including a refrigerant compressor arranged in said machinery compartment and a first refrigerant condenser arranged in heat-exchange relation with said storage chamber and a second refrigerant condenser arranged in said machinery compartment and a first refrigerant evaporator arranged in heat-exchange relation with said storage compartment and a second refrigerant evaporator arranged in said machinery compartment, means for selectively operating said refrigerating machine to circulate refrigerant from said compressor to either one of said condensers and thence to at least one of said evaporators and then back to said compressor, means for effecting circulation of outside air over said second condenser, to cause cooling thereof. and means for effecting circulation of outside air over said second evaporator to cause heating thereof.

5. A kitchen appliance comprising an upstanding substantially box-like base cabinet, a water storage tank arranged in said base cabinet, an upstanding substantially box-like wall cabinet carried by the rear top of said base cabinet, said wall cabinet defining a lower food storage compartment and an upper machinery compartment, a front door carried by the lower front of said wall cabinet and affording access into said food storage compartment, a counter top carried by the front top of said base cabinet and extending between the top front of said base cabinet and the bottom front of said wall cabinet, a refrigerating machine including a refrigerant compressor arranged in said machinery compartment and a refrigerant condenser arranged in heat-exchange relation with said water storage tank and a refrigerant evaporator arranged in heat-exchange relation with said water storage tank and a refrigerant evaporator arranged in heat-exchange relation with said food storage compartment, and means for controlling operation of said refrigerating machine to effect heating of water stored in said water storage tank and cooling of food stored in said food storage compartment.

6. A kitchen appliance comprising an upstanding substantially box-like wall cabinet defining a lower food storage compartment and an upper machinery compartment, a front door carried by the lower front of said wall cabinet and affording access into said food storage compartment, a refrigerating machine arranged in said machinery compartment and including a refrigerant compressor and a refrigerant condenser and a refrigerant evaporator, said food storage compartment being arranged in heat-exchange relation with said evaporator, said wall cabinet also being provided with duct structure including a first air inlet from the kitchen and a second air inlet from the outside and a first air outlet to the kitchen and a second air outlet to the outside, and means for operating said refrigerating machine and for circulating a first current of air into said first air inlet and then into heat-exchange relation with said evaporator and thence through said first air outlet and for circulating a second current of air into said second air inlet and then into heat-exchange relation with said condenser and thence through said second air outlet.

7. The kitchen appliance set forth in claim 6, wherein said first air inlet from the kitchen is disposed in one of the side walls of said cabinet and below said machinery compartment and communicates with an air inlet flue disposed exteriorly of an adjacent first heat-insulating side wall of said food storage compartment, and extends upwardly into said machinery compartment, and wherein said first air outlet into the kitchen is disposed in the other of the side walls of said cabinet and below said machinery compartment and communicates with an air outlet flue disposed exteriorly of an adjacent second heat-insulating side wall of said food storage compartment and extends upwardly into said machinery compartment.

8. A kitchen appliance comprising an upstanding substantially box-like wall cabinet defining a lower food storage compartment and an upper machinery compartment, a front door carried by the lower front of said wall cabinet and affording access into said food storage compartment, a refrigerating machine arranged in said machinery compartment and including a refrigerant compressor and a refrigerant condenser and a refrigerant evaporator, said food storage compartment being arranged in heat-exchange relation with said evaporator, said wall cabinet also being provided with duct structure including a first air inlet from the kitchen and a second air inlet from the outside and a first air outlet to the kitchen and a second air outlet to the outside, means for operating said refrigerating machine and for circulating a first current of air into said first air inlet and then into heat-exchange relation with said evaporator and thence through said first air outlet and for circulating a second current of air into said second air inlet and then into heat-exchange relation with said condenser and thence through said second air outlet, and means for exhausting air from the kitchen into said first air inlet and then for discharging the same from said second air outlet to the outside.

9. A kitchen appliance comprising an upstanding substantially box-like wall cabinet defining a lower food storage compartment and an upper machinery compartment, a front door carried by the lower front of said wall cabinet and affording access into said food storage compartment, a refrigerating machine arranged in said machinery compartment and including a refrigerant compressor and a refrigerant condenser and a refrigerant evaporator, said food storage compartment being arranged in heat-exchange relation with said evaporator, said wall cabinet also being provided with duct structure including a first air inlet from the kitchen and a second air inlet from the outside and a first air outlet to the kitchen and a second air outlet to the outside, means for operating said refrigerating machine and for circulating a first current of air into said first air inlet and then into heat-exchange relation with said evaporator and thence through said first air outlet and for circulating a second current of air into said second air inlet and then into heat-exchange relation with said condenser and thence through said second air outlet, and means for drawing air from the outside into said second air inlet and then for discharging the same from said first air outlet into the kitchen.

10. A kitchen appliance comprising an upstanding substantially box-like wall cabinet defining a lower food storage compartment and an upper machinery compartment, a front door carried by the lower front of said wall cabinet and affording access into said food storage compartment, a refrigerating machine arranged in said machinery compartment and including a refrigerant compressor and a refrigerant condenser and a refrigerant evaporator, said food storage compartment being arranged in heat-exchange relation with said evaporator, said wall cabinet also being provided with duct structure including a first air inlet from the kitchen and a second air inlet from the outside and a first air outlet to the kitchen and a second air outlet to the outside, a first control switch having off and on positions, means governed by said first control switch in its on position for operating said refrigerating machine and for circulating a first current of air into said first air inlet and then into heat-exchange relation with said evaporator and thence through said first air outlet and for circulating a second current of air into said second air inlet and then into heat-exchange relation with said condenser and thence through said second air outlet, a second control switch having off and on positions, means governed jointly by said first control switch in its off position and by said second control switch in its on position for exhausting air from the kitchen into said first air inlet and then for discharging the same from said second air outlet to the outside, a third control switch having off and on positions, and means governed jointly by said first control switch in its off position and by said third control switch in its on position for drawing air from the outside into said second air inlet and then for discharging the same from said first air outlet into the kitchen.

11. A kitchen appliance comprising an upstanding substantially box-like wall cabinet defining a lower food storage compartment and an upper machinery compartment, a front door carried by the lower front of said wall cabinet and affording access into said food storage compartment, a refrigerating machine arranged in said machinery compartment and including a refrigerant compressor and a refrigerant condenser and a first refrigerant evaporator and a second refrigerant evaporator, valve means for selectively by-passing said first evaporator, said food storage compartment being arranged in heat-exchange relation with said first evaporator, thermostatic means governed by the temperature of said food storage compartment for selectively controlling said valve means, said wall cabinet also being provided with duct structure including a first air inlet from the kitchen and a second air inlet from the outside and a first air outlet to the kitchen and a second air outlet to the outside, and means for operating said refrigerating machine and for circulating a first current of air into said first air inlet and then into heat-exchange relation with said second evaporator and thence through said first air outlet and for circulating a second current of air into said second air inlet and then into heat-exchange relation with said condenser and thence through said second air outlet.

12. The kitchen appliance set forth in claim 5, wherein said base cabinet has a standard height and a standard depth from back to front so that it will be properly aligned when it is fit into a standard kitchen base cabinet line, and said wall cabinet has a standard height and a standard depth from back to front so that it will be properly aligned when it is fit into a standard kitchen wall cabinet line.

13. The kitchen appliance set forth in claim 5, wherein said base cabinet is provided with a removable front wall panel to afford access into said storage chamber, wherein the upper front of said wall cabinet is provided with a removable front wall panel to afford access into said machinery compartment, and wherein both said wall cabinet and said front door include heat-insulation for retarding the flow of heat into said storage compartment from said base cabinet and from said machinery compartment and from the kitchen.

References Cited in the file of this patent
UNITED STATES PATENTS

| | | |
|---|---|---|
| 1,926,341 | Lipman | Sept. 12, 1933 |
| 2,539,613 | Earle | Jan. 30, 1951 |
| 2,767,960 | Fast | Oct. 23, 1956 |
| 2,823,902 | Reynolds | Feb. 18, 1958 |

UNITED STATES PATENT OFFICE

CERTIFICATE OF CORRECTION

Patent No. 2,934,913                                          May 3, 1960

Edward M. Haines et al.

It is hereby certified that error appears in the printed specification of the above numbered patent requiring correction and that the said Letters Patent should read as corrected below.

Column 19, lines 49 to 51, strike out "water storage tank and a refrigerant evaporator arranged in heat-exchange relation with said".

Signed and sealed this 4th day of October 1960.

(SEAL)
Attest:

KARL H. AXLINE                                            ROBERT C. WATSON
Attesting Officer                                        Commissioner of Patents